Aug. 16, 1932.　　G. W. O'BRIEN　　1,871,551
HEADLIGHT
Filed July 28, 1931

WITNESSES

INVENTOR
George W. O'Brien
BY
ATTORNEYS

Patented Aug. 16, 1932

1,871,551

UNITED STATES PATENT OFFICE

GEORGE W. O'BRIEN, OF JERSEY CITY, NEW JERSEY

HEADLIGHT

Application filed July 28, 1931. Serial No. 553,656.

This invention relates to headlights for vehicles, and has particular reference to an automobile headlight which embodies an improved means under control of the operator of the vehicle, for effectually dimming the headlight, and which functions to positively eliminate any glare upon the eyes of the operators of approaching vehicles, while affording sufficient light for the illumination of the roadway in advance of the vehicle to guide the operator thereof in keeping to the roadway.

The invention comprehends a headlight of the indicated character, in which the lamp is movable from its normal position at the focus of a parabolic reflector where the strongest reflection and projection of light rays is obtained, to a retracted dimming position, where a screen is disposed in front of the lamp to soften the character of the major portion of the light emitted while permitting the remaining smaller proportion of the light to be reflected by the reflector.

More particularly, the invention resides in a headlight having means for dimming the same which consists in moving the lamp to a retracted position in rear of and entirely outside of the confines of the reflector and at the same time disposing in front of said retracted lamp, a screen of such a nature that it varies the character of and softens the major portion of the light admitted to the reflector area, while refracting the remaining smaller portion thereof for reflection by the reflector.

The invention further resides in a headlight equipped with an improved means for dimming the same arranged within the headlight casing, and which means employs but few and simple parts capable of economical production, assembly and incorporation in the headlight structure, and which means is highly efficient in its purpose.

With the above recited and other objects in view, reference is had to the following description and accompanying drawing, in which there is exhibited one example or embodiment of the invention, while the claims define the actual scope of the same.
In the drawing:

Figure 2:
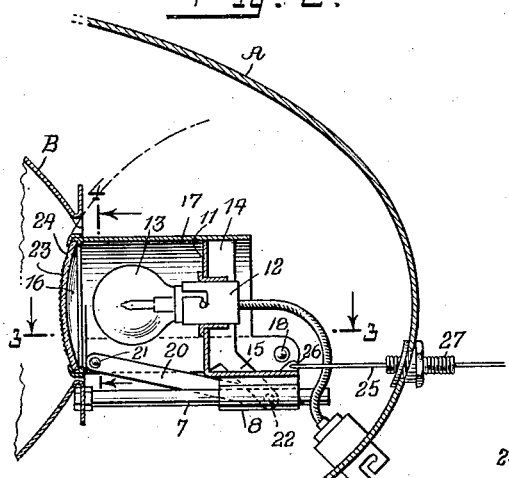
Figure 2 is a fragmentary vertical longitudinal sectional view illustrating the lamp in its retracted and dimmed position.
Figure 3:
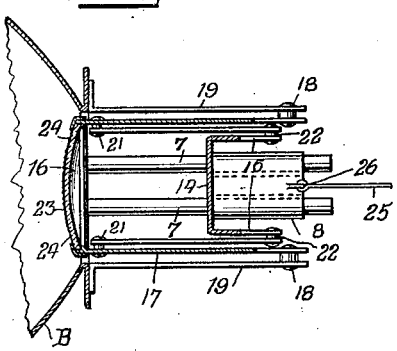
Figure 3 is a fragmentary horizontal sectional view taken approximately on the line indicated at 3—3 in Figure 2.
Figure 4:
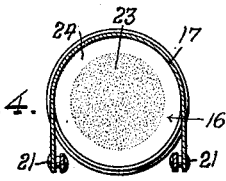

Figure 4 is a transverse sectional view taken approximately on the line indicated at 4—4 in Figure 2.
Referring to the drawing by characters of reference, A designates the headlight casing, which may be of any desired configuration and which has supported in the forward portion thereof the usual parabolic reflector B, which in the present instance is formed with an opening 5 at the vertex, and which reflector has provided at the rear thereof a flange 6 located within the rear portion of the casing A. The flange 6 is merely illustrative of one means for supporting the dimming mechanism and, obviously, within the scope of the invention, other equivalent means may be resorted to. As illustrated, the lower portion of the flange has projecting rearwardly therefrom and perpendicular thereto, a pair of supporting and guide rods 7 which accommodate for forward and rearward sliding movement the sleeves 8 of a carriage 9, which is shown as constructed of sheet material bent to provide angularly related leaves constituting a base portion 10 and an upstanding portion 11, the latter upstanding portion having arranged therein a lamp socket 12, in which a headlight lamp 13 is received. The upstanding portion is further provided with rearwardly directed side flanges 14, each of which is formed with a rearwardly and downwardly inclined arm 15, which arms terminate in the horizontal plane of the guide rods 7. The lamp 13 is disposed for axial movement in the axis of the parabolic reflector B and is shiftable with the carriage forwardly and rearwardly respectively to and from a position at the focus of the reflector B, said lamp in its rearward position, as illustrated in Figure 2, being disposed wholly outside of the confines of the reflector B or in rear of said reflector.

Figure 1:
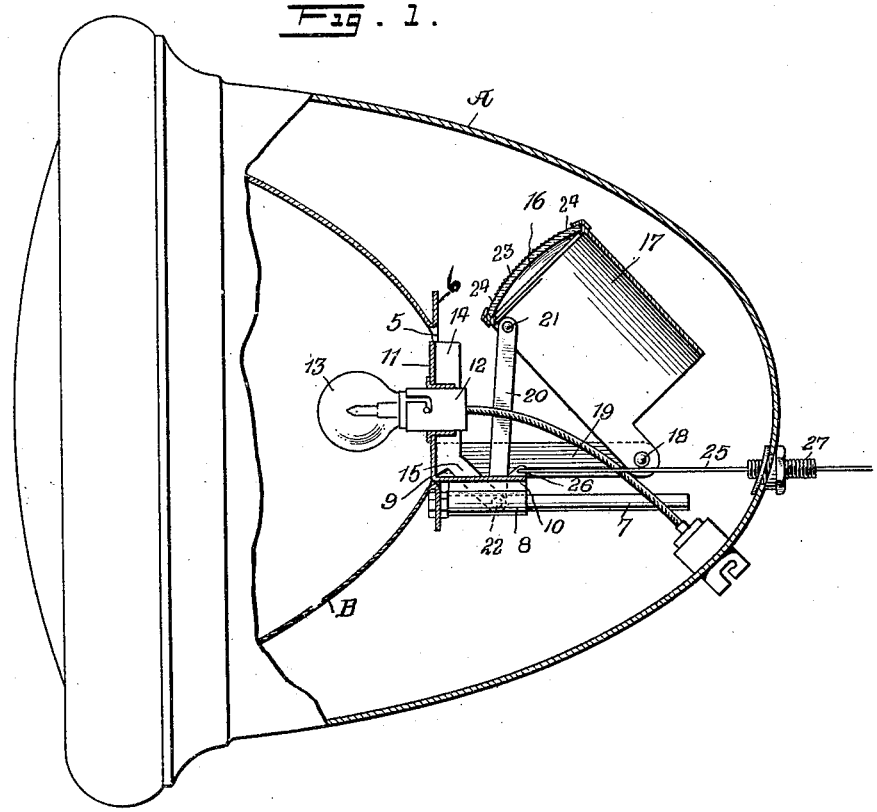
Figure 1 is a side view of a headlight constructed in accordance with the invention, parts being broken away and shown in section and disclosing the lamp in its normal position for the strongest reflection and projection of the light rays therefrom.

The dimming mechanism further includes a screen 16, which is in the nature of a concavo-convex lens carried at the forward end of a lens support 17 which is fulcrumed as at 18 for vertical swinging movement from an elevated inactive position when the lamp 13 is in its normal forward position to a lowered active position when the lamp is retracted. It is obvious that the reflector support 17 may be fulcrumed in various ways, but as herein illlustrated, it is fulcrumed to the rearwardly projecting bracket arms 19 which are attached to the flange 6. In order to effect the movement of the screen 16 and its support 17 in unison with the movement of the lamp 13, links 20 are employed, one end of each of which is fulcrumed as at 21 to the screen support 17, and the other end of each of which is fulcrumed as at 22 to the terminals of the arms 15. It is thus apparent that upon rearward movement of the carrier 9 from the position illustrated in Figure 1, the screen 16 and its support 17 swing downwardly coincident with the retractive movement of the lamp 13 where the screen is disposed in front of the lamp. Conversely, upon forward movement of the carrier 9 from the position illustrated in Figure 2, the screen and screen support move upwardly coincident with the forward movement of the carrier and lamp 13.

The screen or lens 16 preferably has a ground central screening surface 23 for softening the major portion of the light emitted therethrough while the marginal annular portion 24 thereof is transparent. The transparent portion 24 permits a smaller proportion of the light rays emitted to be refracted upon and reflected by the surface of the reflector B. This produces a sufficient light to illuminate the roadway whereby the operator of the vehicle may guide the same and keep to the roadway, while the glare on the eyes of the driver of an approaching vehicle is reduced and prevented from having a dazzling effect.

Obviously, the carriage may be shifted forwardly and rearwardly in any desired manner, but as illustrated, this is accomplished by a flexible shaft 25 which is connected as at 26 to the base leaf 10 of the carriage and extends therefrom through a flexible tubing 27 leading through the casing A and to a point within convenient reach of the operator of the vehicle. It will be observed in Figure 1 that the fulcrum point 22 of the link where it is connected with the arms 15 is slightly in advance of the fulcrum point 21 when the lamp 13 is in its normal forward position. This functions as a past center lock for supporting the weight of the screen and its casing, thereby preventing accidental dimming of the headlight and relieving the flexible shaft 25 of any strain in holding the parts in normal position.

While there has been illustrated and described a single and preferred embodiment of the invention, no limitation is necessarily intended to the precise structural details herein exihibited, and it is to be understood that variations and modifications which properly fall within the scope of the claims may be resorted to when desired.

What is claimed is:

1. A headlight including a parabolic reflector having an opening at its vertex, and a lamp mounted for movement through said vertex opening from a normal position at the focus to a retracted position in rear of the vertex opening and wholly outside of the confines of the reflector and a screen movable from a normal out-of-the-way position when the lamp is projected forwardly, to a position in front of said lamp when the same is retracted.

2. A headlight including a casing, a parabolic reflector within the casing having an opening at the vertex, a lamp mounted for movement through said vertex opening from a normal position at the focus to a retracted position in rear of the vertex, a screen movable from a normal out-of-the-way position when the lamp is projected forwardly, to a position in front of said lamp when retracted and a common means for moving said lamp and screen in unison.

3. A headlight including a casing, a parabolic reflector within the casing having an opening at the vertex, a lamp mounted for movement through said vertex opening from a normal position at the focus to a retracted position in rear of the vertex, a carrier for said lamp supported within the casing in rear of the reflector for forward and rearward shifting movement and a screen movable from a normal out-of-the-way position to a position in front of said lamp when retracted.

4. A headlight including a casing, a parabolic reflector within the casing having an opening at the vertex, a lamp mounted for movement through said vertex opening from a normal position at the focus to a retracted position in rear of the vertex, a carrier for said lamp supported within the casing in rear of the reflector for forward and rearward shifting movement, a screen movable from a normal out-of-the-way position to a position in front of said lamp when retracted, a support for said screen fulcrumed to swing into and out of the axis of movement of the lamp and a link connecting said carrier and screen support.

5. A headlight including a casing, a parabolic reflector within the casing having an opening at the vertex, a lamp mounted for movement through said vertex opening from a normal position at the focus to a retracted position in rear of the vertex, a carrier for said lamp supported within the casing in rear of the reflector for forward and rearward shifting movement, a screen movable from a normal out-of-the-way position to a position in front of said lamp when retracted, a support for said screen fulcrumed to swing into and out of the axis of movement of the lamp, a link connecting said carrier and screen support and means for moving said carrier forwardly and rearwardly.

6. A headlight including a casing, a parabolic reflector within the casing having an opening at the vertex, a lamp mounted for movement through said vertex opening from a normal position at the focus to a retracted position in rear of the vertex, a carrier for said lamp supported within the casing in rear of the reflector for forward and rearward shifting movement, a screen movable from a normal out-of-the-way position to a position in front of said lamp when retracted, a support for said screen fulcrumed to swing into and out of the axis of movement of the lamp and a link connecting said carrier and screen support, the pivotal points of connection of the link with the carrier and screen support being movable to a past center relation when the screen is in its out-of-theway position to lock said screen support against movement independently of the carrier.

7. A headlight including a reflector having an opening therein, a lamp mounted for movement through said opening from a normal position in front of the reflector to a retracted position in rear thereof and a screen movable from a normal out-of-the-way position when the lamp is projected forwardly to a position in front of the lamp when the same is retracted.

8. A headlight including a reflector having an opening therein, a lamp mounted for movement through said opening from a normal position in front of the reflector to a retracted position in rear thereof and a screen movable from a normal out-of-the-way position when the lamp is projected forwardly to a position in front of the lamp when the same is retracted, said screen being of concavoconvex configuration and having a translucent central portion and a transparent marginal portion and adapted to protrude when in its active position slightly in front of the reflector so as to admit through the transparent marginal portion light rays for reflection by the reflector.

GEORGE W. O'BRIEN.